United States Patent [19]
Holder

[11] 3,929,091
[45] Dec. 30, 1975

[54] AUTOMATICALLY INFLATING AND LIBERATING A BALLOON
[76] Inventor: Philippe Holder, Avoriaz (Haute Savoie), France
[22] Filed: Apr. 8, 1974
[21] Appl. No.: 458,501

[30] Foreign Application Priority Data
Apr. 10, 1973 France .............................. 73.12859

[52] U.S. Cl. ................ 116/124 B; 9/9; 116/DIG. 9; 222/5
[51] Int. Cl.² ............................................ G09F 9/00
[58] Field of Search ........ 116/124 B, DIG. 9; 46/87, 46/90; 141/67; 222/3, 5; 92/24; 9/9

[56] References Cited
UNITED STATES PATENTS

| 2,882,862 | 4/1959 | Waldorff et al. | 92/24 X |
|---|---|---|---|
| 3,216,466 | 11/1965 | Simko | 222/3 X |
| 3,487,810 | 1/1970 | Clement | 116/124 B |

FOREIGN PATENTS OR APPLICATIONS

| 1,129,409 | 10/1968 | United Kingdom | 116/124 B |

*Primary Examiner*—Richard C. Queisser
*Assistant Examiner*—Daniel M. Yasich
*Attorney, Agent, or Firm*—Woodard, Weikart, Emhardt & Naughton

[57] ABSTRACT

A device including a source of gas under pressure, a balloon designed to be inflated by this source of gas and means of holding the balloon and connecting the balloon to the source of gas, in particular, for drawing attention to persons in danger, the means of holding the balloon and connecting the balloon to the source of gas including a device for holding the balloon including two opposing parts subjected to the action of resilient means the action of which opposes the pressure of gas from said source of compressed gas, in a manner such that the balloon is held by said device for as long as the force developed by the gas is greater than the force of the resilient means.

3 Claims, 10 Drawing Figures

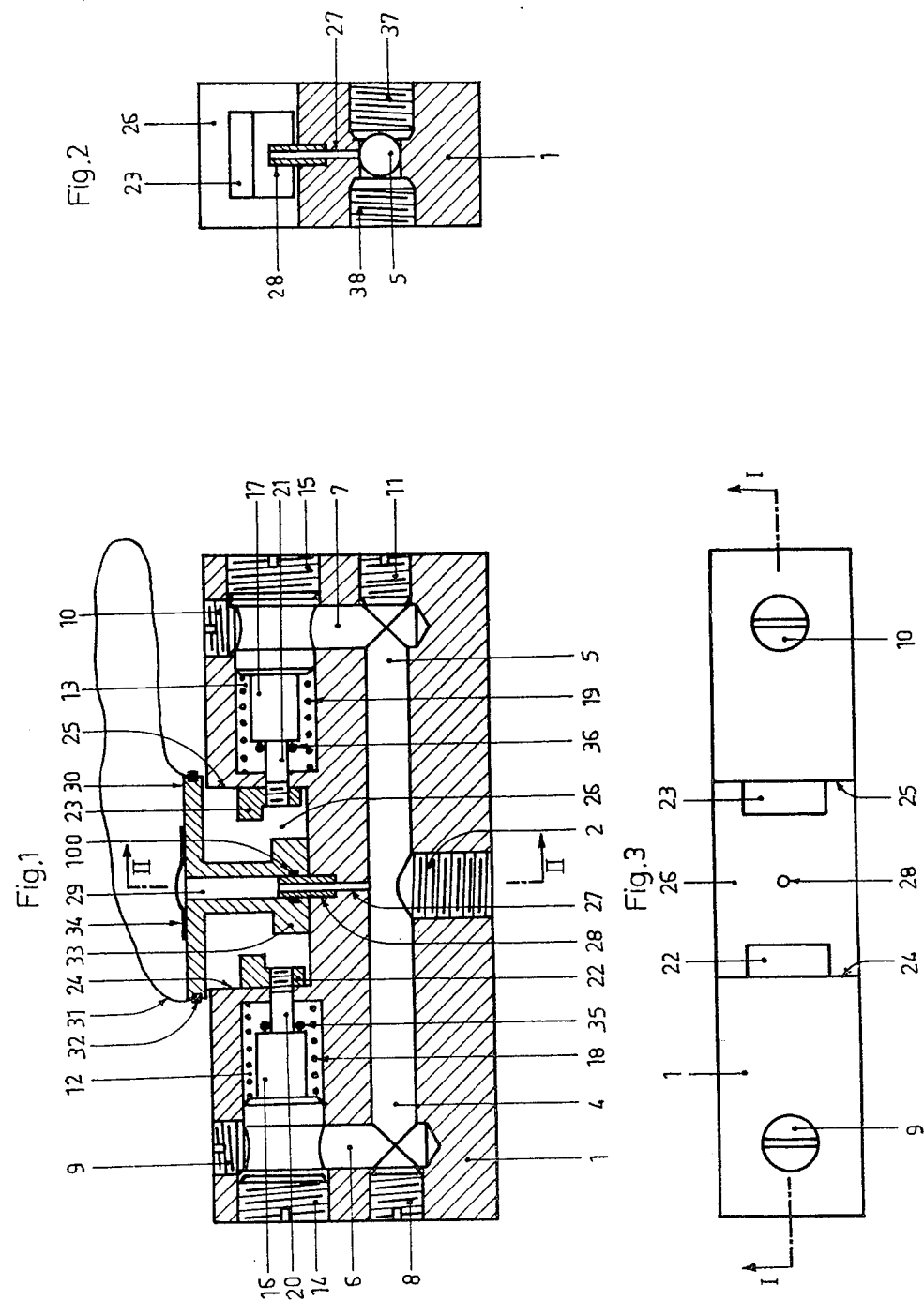

AUTOMATICALLY INFLATING AND LIBERATING A BALLOON

The present invention relates to a device for automatically inflating and liberating a balloon, in particular, for drawing attention to persons in danger, and in particular, to persons surprised and buried by an avalanche, where it is essential that the balloon should be inflated as soon as possible, automatically, and liberated automatically as soon as it has been inflated.

The object of the present invention is precisely to meet these requirements.

To this end, the invention relates to a device comprising a source of gas under pressure, a balloon designed to be inflated by this source of gas, and means of holding the balloon and connecting the balloon to the source of gas, in particular, for drawing attention to persons in danger, which invention is characterised in that said means of holding the balloon and of connecting the balloon to the source of gas comprise a device for holding the balloon including opposite parts subjected to the action of resilient means of which the action opposes the pressure of gas of said source of compressed gas, in a manner such that the balloon is held by said device for as long as the force developed by the pressure of the gas is greater than the force of the resilient means.

The accompanying drawings show, by way of example, a number of embodiments of the invention.

FIG. 1 shows a longitudinal section along I—I in FIG. 3 of a device for holding a balloon and connecting it to a cylinder of compressed gas according to the first embodiment.

FIG. 2 shows a variant, in sectional representation, according to II—II in FIG. 1.

FIG. 3 shows a plan view, corresponding to the variant according to FIG. 2.

Figure 4:
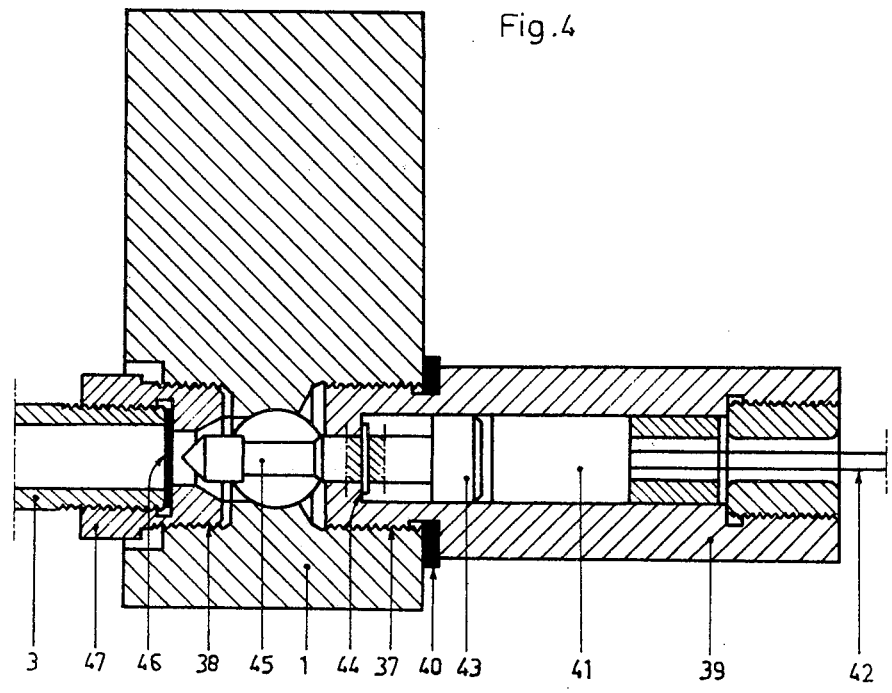
FIG. 4 shows pyrotechnic perforating device used in combination with the device according to the FIGS. 1 to 3.

Reference should now be made to FIGS. 1 to 4.

The device shown in FIGS. 1 to 3 comprises a metal block 1 in which are machined a threaded duct 2 designed to be screwed to a connecting part so as to be connected to a cylinder of compressed gas (FIG. 4), the ducts 4,5 6 and 7 are hermetically sealed by the screwed stoppers 8,9,10 and 11, and two cylindrical lodgments 12 and 13 also are hermetically sealed by the screwed stoppers 14 and 15, and in which are lodged the pistons 16 and 17 maintained in the retracted position with respect to the center of the metal block 1 by the return springs 18 and 19 compressed between the piston heads and the bottoms of the cylindrical lodgments, 20 and 21 respectively, passing through the bottom of the cylindrical lodgments 12 and 13 and to the end of which are fixed the jaws 22 and 23 which, under the influence of the return springs 18 and 19, press, in their rest position, against the walls 24 and 25 of the rectangular space 26. Lastly, the body 1 has a small diameter duct 27 which connects the duct 2 and a socket 28 engages opening 29 of a member 30. Member 30 has a generally cylindrical form and is made of a light material and the upper part of which is in the form of a tray at the periphery of which is fixed a balloon 31 designed to be inflated by means of air through attachment 32. An O-ring sealing joint 100 integral with 30 insure that there is a gas-tight seal between the socket 28 and the opening 29. Member 30 has a flared lower portion in the form of a flange 33 and a valve 34 comprising, for example a rubber membrane fixed on part of its periphery only on member 30 above the opening 29 and playing the role of a retaining valve when inflating the balloon 31. The O-ring sealing joints 35 and 36 are located around the lodgments 20 and 21, the role of these joints being described infra.

The sectional view shown in FIG. 2 represents a slight variant from FIG. 1. The threaded duct 2 has been replaced by two threaded ducts 37 and 38 enabling a pyrotechnic device such as is shown in FIG. 2 to be fixed on one side, and on the other side, the collar of the compressed gas cylinder.

FIG. 4 shows the pyrotechnic device for opening the compressed gas cylinder 3. This pyrotechnic device comprises a a body 39, screwed into the threaded duct 37, a sealing gasket 40 being interposed between the metal block 1 and pyrotechnic device body 39 to ensure sealing. The body 39 holds an igniter and a charge 41 fired electrically by the conducting wires 42. The pyrotechnic perforator, in principle, is analogous to the pyrotechnic perforators that are found in commerce (PYROMECA). The explosion acts on a piston 43 retained by safety pin 44, which gives way when the explosion occurs, enabling the perforator 45 to pierce a metal cap 46 made, for example, of brass, closing the end of the collar of the compressed gas cylinder 3 and fixed on the collar of cylinder 3 by a socket 47 screwed on the collar and itself screwing into the opening 38 of the metal block 1 supporting the balloon 31.

The device operates in the following manner: since the balloon 31 and member 30 are maintained in the position shown in FIG. 1 by friction of the O-ring sealing joint 100 on the socket 28 and, if necessary, by a cover hooked on the metal block 1 in a manner analogous to the cover shown in FIG. 6, when the carrier of the device, for example, a skier, or an alpinist, is surprised by an avalanche, sets off the device by a shout sensitizing an electro-acoustic device, firing the pyrotechnic perforator 45 and perforating the cap 46. The gas escaping under pressure from the cylinder 3, passes through the large diameter ducts 4,5,6 and 7, and exerts a srong pressure on the pistons 16 and 17, which causes the jaws 22 and 23 to approach one another and hook onto the flange 33 of the member 30. The path of the pistons 16 and 17 is limited by the base of their lodgments which abut the O-sealing joints 35 and 36 which in turn prevent the gas escaping through the lodgments 20 and 21, to the exterior. As the gas continues to escape from the cylinder 3, it inflates the balloon 31 by passing through the duct 27, the socket 28, the opening 29 of member 30 and the valve 34. The amount of gas contained in the cylinder 3 is chosen so that it is just sufficient to inflate the balloon 31 without their being any risk of it exploding. Once the balloon has been inflated to a suitable pressure, the pressure of the gas in the cylinder 3 is no longer sufficient to compensate for the force of the return springs 18 and 19 which push back the pistons 16 and 17, thereby liberating the flange 33 of the member 30 of the balloon 31 which then allows the gas to escape. In the application described, namely, drawing attention to a person surprised by an avalanche, the balloon 31 is of course connected to a wire, preferably wound onto a conical reel.

Figure 5:
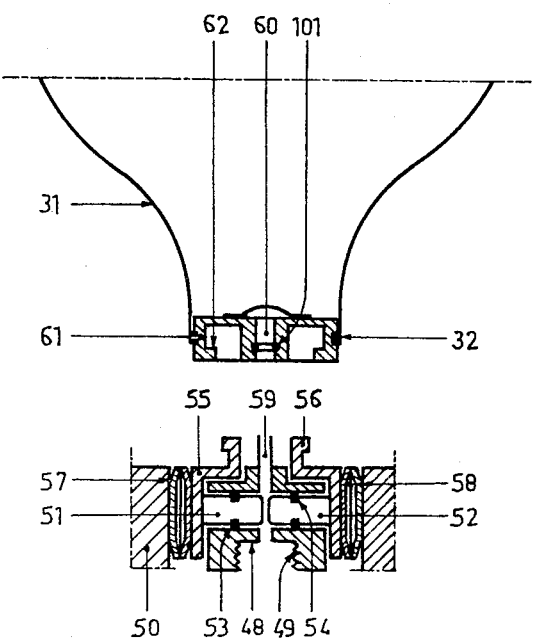
FIG. 5 shows a second embodiment of the device for holding and liberating the balloon.

In the embodiment shown partially in FIG. 5, the device which supports the balloon 31 comprises a solid part 48 pierced by a threaded opening 49 enabling the part 48 to be connected to a compressed gas cylinder, as at 3. At 50 is partially shown a support framework to which is fixed, for example, a pyrotechnic perforator 45, the compressed gas cylinder 3, and a cover protecting the balloon 31 as shown in FIG. 6. The part 48 is pierced transversally and in pierced portion are lodged two pistons 51 and 52 provided with O-ring sealing joints 53 and 54. At the opposite ends of the pistons are fixed two parts 55 and 56 bent in the form of corresponding hooks. The pistons 51 and 52 are maintained normally against one another by two springs 57 and 58, compressed between the members 55 and 56 and the walls of a lodgment made in the framework 50 in which the part 48 lodges. This part 48 has an axial bore 60 which is extended by a tubing 59 designed to engage in the axial bore 60 of support 61 integral with the balloon 31, analogous to the member 30 in FIG. 1, but of a slightly different form and having a border 62 in its lower part behind which hooks 55 and 56 can be hooked. The hole 60 is also provided with an O-ring sealing joint 101. This device operates in a manner analogous to the device shown in FIG. 1, the pistons 51 and 52 which recede under the effect of the pressure of the gas coming through the threaded opening 49 pushing aside the members 55 and 56 which hook onto the border 62 of the support 61 and hold the balloon 31 until the pressure of the gas is insufficient to oppose the action of springs 57 and 58 which push back the pistons 51 and 52 toward one another and liberate the balloon 31. This embodiment has the advantage that it can be made in a more compact manner than the embodiment according to FIG. 1.

Figure 6:
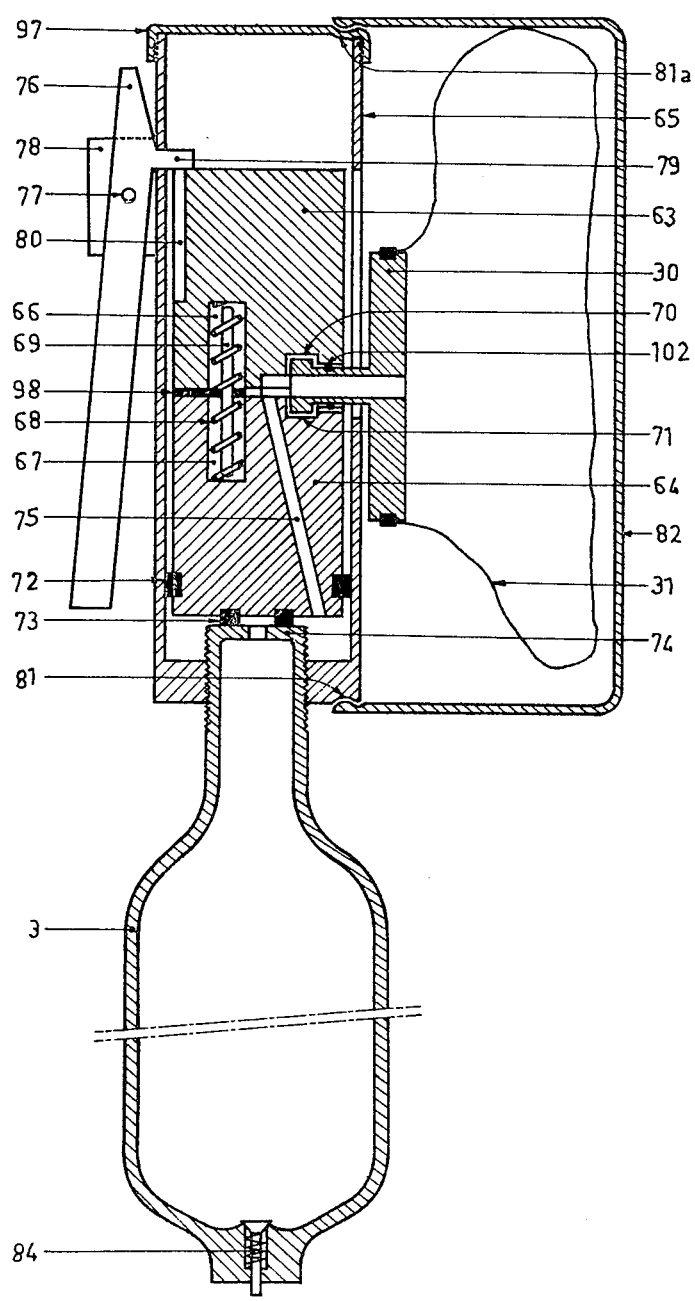
FIG. 6 shows, in section, a third embodiment.

The embodiment shown in FIG. 6 is particularly compact. The two opposing members comprising pistons 63 and 64 lodged in a cylinder 65 threadedly engaged at one end by the compressed gas cylinder 3 such that a seal is obtained and closed by a cover 97 at the other end. The faces of the pistons 63 and 64 opposite one another are provided with blind openings 66 and 67 respectively which engage a spring 68 which tends to separate the pistons from one another. A bar 69 passes through the spring 68 axially for the purpose of preventing it from being crippled when the pistons 63 and 64 move away from one another, the spring 68 no longer being guided along its entire length by the walls of the openings 66 and 67. The opposite faces of pistons 63 and 64 moreover have two corresponding recesses 70 and 71 in which the base of member 30 of the balloon 31 is held, as is shown in FIG. 1. The piston 64 is provided with an O-ring sealing joint 72, and a second joint 73 on its lower face and which is, applied to the end 74 of the collar of the cylinder 3 in order to close the latter. The piston 64 is traversed by an oblique duct 75 which connects its lower face, outside the perimeter of the joint 73, and the recesses 70 and 71, of which the base is connected to the threaded opening 29 in the support member 30 for balloon 31. On one of the pistons 63 or 64 is fixed, for example, by glueing, and in addition a flat joint 98 in the form of a disc with two cutout portions, one for the passage of the spring 68 and the other to take up the shape of the recess of the piston 63; the joint 98 partly seals the cavity formed by the recesses 70 and 71 into which the duct 75 projects. The cylindrical passage 99 (FIG. 7) surrounding the support member 30 of the balloon 31 is sealed with an O-ring sealing joint 102 fixed on support member 30.

A lever 76 is pivoted on cylinder 65 around a spindle 77 on support 78. This lever 76 has a spigot 79 which, in the position shown in the drawing, holds the piston 63 and with it the piston 64, in a manner such that the joint 73 engages the end of the cylinder 3 when the cylinder 65 is being screwed onto the cylinder 3. The piston 63 has a longitudinal groove 80 which the spigot 79 engages when lever 76 is pressed, so that the piston 63 can rise again being guided by the interaction of the groove 80 and the spigot 79. The cylinder 65 and the cover 97 have grooves 81 and 81a, which hooks the cover 82 protecting the balloon 31 that is to be inflated. This cover 82 unhooks automatically under the pressure of the balloon 31 in the course of being inflated.

Figure 7:
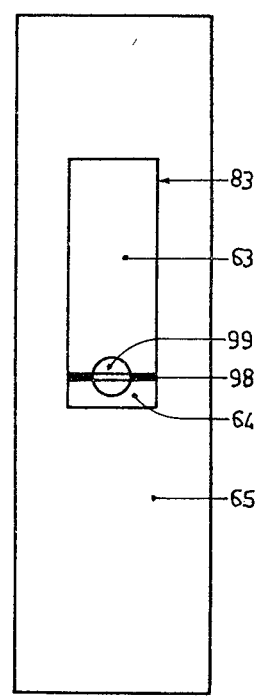
FIG. 7 shows a front view of the third embodiment without the cover or balloon.

FIG. 7, which represents a front view of the device, with the cover 82 and support member 30 of the balloon 31 removed, shows that the cylinder 65 has a rectangular window 83 of which the aim is to allow the upward displacemnt of the pistons 63 and 64 carrying along support member 30 of the balloon 31.

The device operates in the following manner: after the lever 76 has been actuated, either manually or automatically, by remote acoustic means or the like, the pressure of the gas in the cylinder 3 pushes back the pistons 63 and 64 immediately against the top of the cylinder 65, that is to say, against the flat joint 98 between the pistons 63 and 64, thus preventing the escape of gas between the pistons and through the openings in the cylinder 65. Simultaneously, the gas flows through the duct 75 and inflates the balloon. When the pressure of the gas in the lower part of the cylinder 65 is no longer sufficient to oppose the action of the spring 68, the latter separates the pistons, liberating the balloon. The cover 82 detaches itself under the pressure of the balloon before its liberation. The device can be used again. After locking the pistons by means of the lever 76 and screwing the cylinder 65 onto the cylinder 3, the latter is filled from the bottom through a valve 84.

Figure 8:
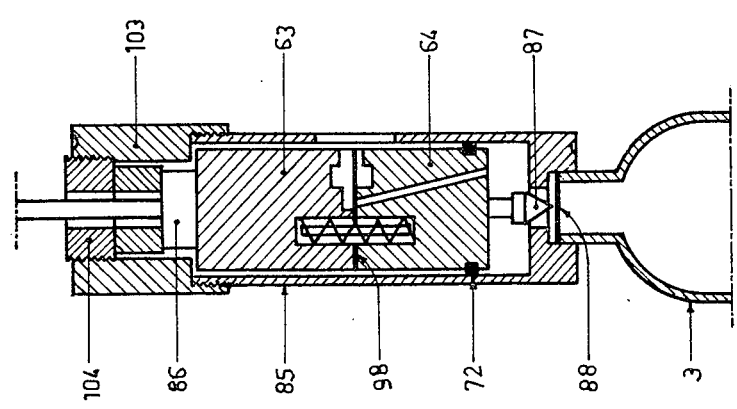
FIG. 8 shows a first variant of FIG. 6.

FIG. 8 represents a variation of the embodiment shown in FIG. 6. The pistons 63 and 64 are lodged in a cylinder 85 the upper end of which threadedly receives a housing, 103 which includes a pyrotechnic device 86, analogous to the device in FIG. 4 and closed by a threaded stopper 104. The cylinder 85 can be screwed or soldered onto the cylinder 3. The piston 64 carries, at its lower end, a perforator 87, which perforates a metal cap 88 closing the cylinder 3. After perforation, the pistons are pushed against the housing 103 by the gas.

Figure 9:
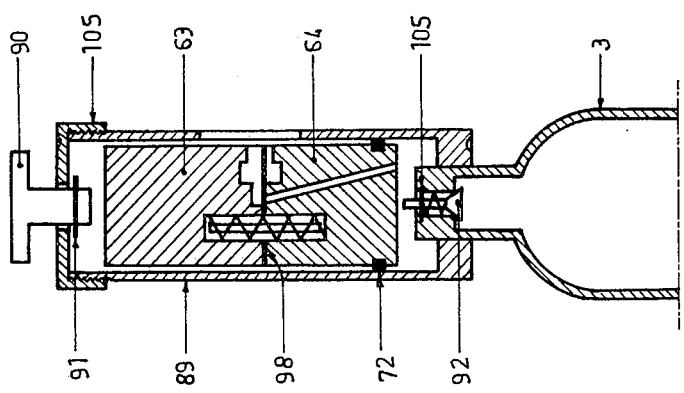
FIG. 9 shows a second variant of FIG. 6.

FIG. 9 represents another variation in which the pistons 63 and 64 are screwed or welded to cylinder 89, the upper end of which is closed by a cover 105, carrying a pusher 90 held by a pin 91. The cylinder 3 is closed by a valve 92. When the pressure exerted on the pusher 90, either by hand or by means of a device with a "punch" effect, the pistons are pushed downward and open the valve 92, enabling the gas to escape from the cylinder. The valve 92, held in the open position by a locking device, for example, a steel washer 106 with radial fins which engage a groove in the valve rod.

Figure 10:
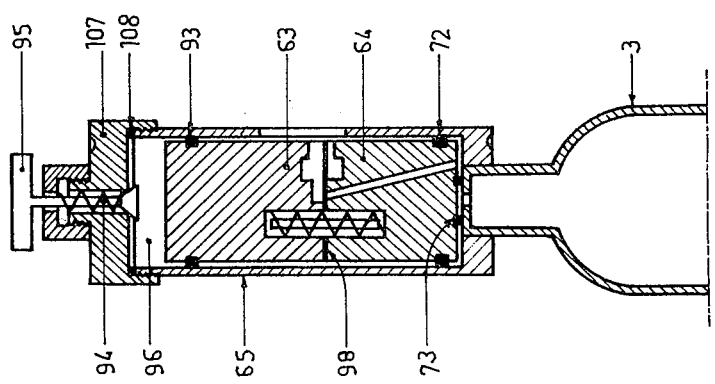
FIG. 10 shows a third variant of FIG. 6.

In a variation represented in FIG. 10, the piston 64 shows the two joints 72 and 73, as in FIG. 6, and the piston 63 also shows an O-ring sealing joint. The cylinder 65 is closed, in its upper part, by a threaded cover 107 provided with a valve 94 integral with the push button 95. A joint 108 seals the cover. The upper part 96 of the cylinder 65 comprises a chamber filled with a gas under pressure, maintaining the piston 64 and its joint 73 against collar of the cylinder 3. When the valve 94 is opened by pressing push-button 95, the compressed gas in the chamber 96 escapes and the pistons are pushed toward the top of the cylinder, as is the case in FIG. 6.

What I claim is:

1. A device for drawing attention to persons in danger comprising:
   a. a source of gas under pressure;
   b. a balloon means maintained in place in a housing and designed to be inflated by means selectively controlling the release of said source of gas; and
   c. integral connecting means for removably interlocking said balloon means to said source of gas including two opposing members subjected to the action of resilient means, said action of said resilient means opposing the pressure of said gas upon release of said gas by said controlling means, such that said balloon means remains connected to said source of gas for as long as the pressure of said gas is greater than the pressure of said resilient means, said connecting means further including a protective cover for said balloon means on the housing and held in position by resilient hooking means, said hooking means being caused to be unhooked from the housing by the pressure of said balloon means being inflated.

2. A device according to claim 1, in which the two opposing parts are constituted by pistons with opposing jaws and subjected to the action of springs maintaining the pistons separated from one another in the absence of a pressure of gas on the pistons.

3. A device according to claim 1, in which the pistons are mounted in a framework provided with ducts connecting the pistons to the source of gas and piping located between jaws on said connecting means on which is fitted a socket integral with the balloon and fitted with a valve, this socket being shaped so that it is held by said jaws when these are close to one another and liberated when said jaws move away from one another.

* * * * *

UNITED STATES PATENT AND TRADEMARK OFFICE
CERTIFICATE OF CORRECTION

PATENT NO. : 3,929,091
DATED : December 30, 1975
INVENTOR(S) : Philippe Holder

It is certified that error appears in the above-identified patent and that said Letters Patent are hereby corrected as shown below:

In column 2, line 8 between "with" and "30" insert --member--.

In column 2, line 8 change "insure" to "insures".

Signed and Sealed this eighteenth Day of May 1976

[SEAL]

Attest:

RUTH C. MASON
Attesting Officer

C. MARSHALL DANN
Commissioner of Patents and Trademarks